Patented Feb. 21, 1950

2,497,971

UNITED STATES PATENT OFFICE 2,497,971

SEPARATION OF PHENOLS

Horace Andrew Basterfield, Norton-on-Tees, England, assignor to Imperial Chemical Industries Limited, a corporation of Great Britain No Drawing. Application June 19, 1945, Serial No. 600,406. In Great Britain June 19, 1944

8 Claims. (Cl. 260—624)

This invention relates to the production and separation of phenols.

I have found that 2:4-dimethyl, 6-tertiary butyl phenol can be separated from mixtures containing it and 2:5-dimethyl, 4-tertiary butyl phenol by treating the mixture with an aqueous solution of a hydroxide of an alkali metal and separating from the mixture the insoluble 2:4-dimethyl, 6-tertiary butyl phenol.

In the preparation of dimethyl butyl phenols by the butylation of a mixture containing 2:4-dimethyl phenol and 2:5-dimethyl phenol, preferential butylation of the 2:4-dimethyl phenol occurs. When butylating with isobutene a given mixture of these dimethyl phenols, the quantity of product which is insoluble in an aqueous solution of a hydroxide of an alkali metal rises to a maximum value, and then decreases. This insoluble product is substantially pure 2:4-dimethyl, 6-tertiary butyl phenol.

As a further feature of the present invention therefore, there is provided a process for the production of 2:4-dimethyl, 6-tertiary butyl phenol from mixtures containing 2:4-dimethyl phenol and 2:5-dimethyl phenol which comprises butylating the mixture to an extent not substantially greater than that at which there is obtained the maximum quantity of product insoluble in an aqueous solution of a hydroxide of an alkali metal, treating the butylated mixture with an aqueous solution of a hydroxide of an alkali metal and separating insoluble 2:4-dimethyl, 6-tertiary butyl phenol from the aqueous alkaline solution.

The mixture containing dimethyl phenols may be butylated by any convenient method, for example, by treating it with isobutene in the presence of a catalyst which may be sulphuric acid or phosphoric acid. The use of sulphuric acid as a catalyst for the butylation of phenols has hitherto been disadvantageous because it leads to the production, in side reactions, of aromatic sulphonic acids, and esters thereof, the latter being particularly difficult to remove from the reaction products. Sulphuric acid is however, a particularly desirable catalyst because of its activity, cheapness and availability, and the process of the present invention enables it to be used satisfactorily in the butylation step. Thus, during the separation of the 2:4-dimethyl, 6-butyl phenol, any sulphuric acid and sulphonic acids contained in the crude reaction mixture from the butylating step are neutralised by caustic alkali and the products of neutralisation remain dissolved in the aqueous solution of caustic alkali and are thus separated from the desired insoluble 2:4-dimethyl, 6-butyl phenol, while the esters of sulphonic acids are substantially completely decomposed by the caustic alkali to give products which also remain dissolved in the aqueous solution of caustic alkali.

The process of the present invention also provides a convenient means for the separation of 2:4-dimethyl phenol from mixtures containing it and 2:5-dimethyl phenol which comprises butylating the mixture, treating the butylated mixture with an aqueous solution of a hydroxide of an alkali metal, separating the insoluble 2:4-dimethyl, 6-tertiary butyl phenol and debutylating by known means to give 2:4-dimethyl phenol. For example the 2:4-dimethyl, 6-tertiary butyl phenol may be debutylated by heating it with a small quantity of sulphuric acid at a temperature of 200° C. or higher. Preferably the mixture is butylated to an extent not substantially greater than that at which there is obtained the maximum quantity of product insoluble in an aqueous solution of a hydroxide of an alkali metal.

The concentration of the aqueous solution of the hydroxide of the alkali metal may vary within wide limits; I have found it satisfactory to use a solution containing 10% by weight.

The treatment of the mixture containing dimethyl butyl phenols with caustic alkali may be carried out satisfactorily at room temperature, but it is preferable to carry out the treatment at elevated temperature, for example at 20° C. to 40° C.

While the separated 2:4-dimethyl, 6-butyl phenol is reasonably pure, it may be further treated for example, by steam distillation, in order to obtain a product having a better colour and a higher degree of purity.

It should be understood that the residual aqueous alkaline solution obtained according to the present invention may also be treated by known means for the recovery of the phenols it contains.

Example 122 gms. of a mixture consisting of 65% of 2:4-dimethyl phenol and 35% of 2:5-dimethyl phenol were treated, in the presence of 4 gms. of 98% by weight sulphuric acid, with a gaseous hydrocarbon mixture containing 12% of isobutene, the temperature being maintained at about 55° C. The gas was passed through the mixture of phenols until 65% butylation had occurred as shown by the absorption of 42 gms. of isobutene. The reaction mixture then had the following composition: 25% dimethyl phenols, 60% 2:4-dimethyl, 6-butyl phenol and 15% 2:5-dimethyl, 4-butyl phenol, these figures representing 33% of unreacted phenols, 54% of 2:4-dimethyl phenol converted to 2:4-dimethyl, 6-butyl phenol and 13% of 2:5-dimethyl phenol converted to 2:5-dimethyl, 4-butyl phenol. This mixture was treated with 20 gms. of caustic soda dissolved in 200 mls. of water, whereby two layers were formed. The insoluble oily layer was separated and steam-distilled to give substantially quantitative recovery of the 2:4-dimethyl, 6-butyl phenol formed.

I claim:

1. A process for the separation of 2:4-dimethyl, 6-tertiary butyl phenol from mixtures containing it and 2:5-dimethyl, 4-tertiary butyl phenol which comprises the steps of treating the mixture with an aqueous solution of a hydroxide of an alkali metal sufficient to dissolve the 2:5-dimethyl, 4-tertiary butyl phenol and separating insoluble 2:4-dimethyl, 6-tertiary butyl phenol from the aqueous liquor containing the dissolved 2:5-dimethyl, 4-tertiary butyl phenol component.

2. A process for the separation of 2:4-dimethyl, 6-tertiary butyl phenol from mixtures containing it and 2:5-dimethyl, 4-tertiary butyl phenol which comprises the steps of butylating a mixture containing 2:4-dimethyl phenol and 2:5-dimethyl phenol, treating the butylated mixture containing 2:4-dimethyl, 6-tertiary butyl phenol and 2:5-dimethyl, 4-tertiary butyl phenol with an aqueous solution of a hydroxide of an alkali metal sufficient to dissolve the 2:5-dimethyl, 4-tertiary butyl phenol and separating insoluble 2:4-dimethyl, 6-butyl phenol from the aqueous liquor containing the dissolved 2:5-dimethyl, 4-tertiary butyl phenol component.

3. A process for the separation of 2:4-dimethyl, 6-tertiary butyl phenol from mixtures containing it and 2:5-dimethyl, 4-tertiary butyl phenol which comprises the steps of butylating a mixture containing 2:4-dimethyl phenol and 2:5-dimethyl phenol with isobutene, treating the butylated mixture containing 2:4-dimethyl, 6-tertiary butyl phenol and 2:5-dimethyl, 4-tertiary butyl phenol with an aqueous solution of a hydroxide of an alkali metal sufficient to dissolve the 2:5-dimethyl, 4-tertiary butyl phenol and separating insoluble 2:4-dimethyl, 6-butyl phenol from the aqueous liquor containing the dissolved 2:5-dimethyl, 4-tertiary butyl phenol component.

4. A process for the separation of 2:4-dimethyl, 6-tertiary butyl phenol from mixtures containing it and 2:5-dimethyl, 4-tertiary butyl phenol which comprises the steps of butylating a mixture containing 2:4-dimethyl phenol and 2:5-dimethyl phenol with isobutene in the presence of an acid selected from the group sulphuric acid, phosphoric acid, treating the butylated mixture containing 2:4-dimethyl, 6-tertiary butyl phenol and 2:5-dimethyl, 4-tertiary butyl phenol with an aqueous solution of a hydroxide of an alkali metal sufficient to dissolve the 2:5-dimethyl, 4-tertiary butyl phenol and separating insoluble 2:4-dimethyl, 6-butyl phenol from the aqueous liquor containing the dissolved 2:5-dimethyl, 4-tertiary butyl phenol component.

5. A process for the separation of 2:4-dimethyl, 6-tertiary butyl phenol from mixtures containing it and 2:5-dimethyl, 4-tertiary butyl phenol which comprises the steps of butylating at a temperature below 60° C. a mixture containing 2:4-dimethyl phenol and 2:5-dimethyl phenol with isobutene in the presence of an acid selected from the group sulphuric acid, phosphoric acid, treating the butylated mixture containing 2:4-dimethyl, 6-tertiary butyl phenol and 2:5-dimethyl, 4-tertiary butyl phenol with an aqueous solution of a hydroxide of an alkali metal sufficient to dissolve the 2:5-dimethyl, 4-tertiary butyl phenol and separating insoluble 2:4-dimethyl, 6-butyl phenol from the aqueous liquor containing the dissolved 2:5-dimethyl, 4-tertiary butyl phenol component.

6. A process for the separation of 2:4-dimethyl, 6-tertiary butyl phenol from mixtures containing it and 2:5-dimethyl, 4-tertiary butyl phenol which comprises the steps of butylating a mixture containing 2:4-dimethyl phenol and 2:5-dimethyl phenol to an extent not substantially greater than that at which there is obtained the maximum quantity of product insoluble in an aqueous solution of a hydroxide of an alkali metal, treating the butylated mixture containing 2:4-dimethyl, 6-tertiary butyl phenol and 2:5-dimethyl, 4-tertiary butyl phenol with an aqueous solution of a hydroxide of an alkali metal sufficient to dissolve the 2:5-dimethyl, 4-tertiary butyl phenol and separating insoluble 2:4-dimethyl, 6-butyl phenol from the aqueous liquor containing the dissolved 2:5-dimethyl, 4-tertiary butyl phenol component.

7. A process for the separation of 2:4-dimethyl, 6-tertiary butyl phenol from mixtures containing it and 2:5-dimethyl, 4-tertiary butyl phenol which comprises the steps of butylating with isobutene a mixture containing 2:4-dimethyl phenol and 2:5-dimethyl phenol to an extent not substantially greater than that at which there is obtained the maximum quantity of product insoluble in an aqueous solution of a hydroxide of an alkali metal, treating the butylated mixture containing 2:4-dimethyl, 6-tertiary butyl phenol and 2:5-dimethyl, 4-tertiary butyl phenol with an aqueous solution of a hydroxide of an alkali metal sufficient to dissolve the 2:5-dimethyl, 4-tertiary butyl phenol and separating insoluble 2:4-dimethyl, 6-butyl phenol from the aqueous liquor containing the dissolved 2:5-dimethyl, 4-tertiary butyl phenol component.

8. A process for the separation of 2:4-dimethyl, 6-tertiary butyl phenol from mixtures containing it and 2:5-dimethyl, 4-tertiary butyl phenol which comprises the steps of butylating with isobutene in the presence of an acid selected from the group consisting of sulphuric acid, phosphoric acid, a mixture containing 2:4-dimethyl phenol and 2:5-dimethyl phenol to an extent not substantially greater than that at which there is obtained the maximum quantity of product insoluble in an aqueous solution of a hydroxide of an alkali metal, treating the butylated mixture containing 2:4-dimethyl, 6-tertiary butyl phenol and 2:5-dimethyl, 4-tertiary butyl phenol with an aqueous solution of a hydroxide of an alkali metal sufficient to dissolve the 2:5-dimethyl, 4-tertiary butyl phenol and separating insoluble 2:4-dimethyl, 6-butyl phenol from the aqueous liquor containing the dissolved 2:5-dimethyl, 4-tertiary butyl phenol component.

HORACE ANDREW BASTERFIELD.

REFERENCES CITED

The following references are of record in the file of this patent:

UNITED STATES PATENTS

| Number | Name | Date |
| --- | --- | --- |
| 2,202,877 | Stevens et al. | June 4, 1940 |
| 2,297,588 | Stevens | Sept. 29, 1942 |
| 2,298,660 | Stevens | Oct. 13, 1942 |